United States Patent
Baek et al.

(10) Patent No.: US 10,343,565 B2
(45) Date of Patent: Jul. 9, 2019

(54) VENTILATED SEAT CUSHION

(71) Applicant: Ford Global Technologies, LLC, Dearborn, MI (US)

(72) Inventors: Hyung Min Baek, Richmond, CA (US); Daniel Boccuccia, San Francisco, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/234,873

(22) Filed: Aug. 11, 2016

(65) Prior Publication Data
US 2018/0043805 A1    Feb. 15, 2018

(51) Int. Cl.
| | |
|---|---|
| *B60N 2/56* | (2006.01) |
| *B29D 99/00* | (2010.01) |
| *B60N 2/64* | (2006.01) |
| *B33Y 80/00* | (2015.01) |

(52) U.S. Cl.
CPC .......... *B60N 2/56* (2013.01); *B29D 99/0092* (2013.01); *B60N 2/64* (2013.01); *B29K 2995/0054* (2013.01); *B29K 2995/0065* (2013.01); *B33Y 80/00* (2014.12)

(58) Field of Classification Search
CPC ........ B60N 2/56; B60N 2/64; B29C 67/0051; B29D 99/0092; B29K 2995/0054; B29K 2995/0065
See application file for complete search history.

(56) References Cited

U.S. PATENT DOCUMENTS

| | | | |
|---|---|---|---|
| 2,931,427 A | 4/1960 | Goldstein | |
| 3,736,022 A | 5/1973 | Radke | |
| 6,893,086 B2 * | 5/2005 | Bajic | B60N 2/56 297/180.11 |

(Continued)

FOREIGN PATENT DOCUMENTS

| | | |
|---|---|---|
| CN | 203864500 U | 10/2014 |
| CN | 105250064 A | 1/2016 |

(Continued)

OTHER PUBLICATIONS

Materialise Slicing Technology Enables Toyota's Lightweight Car Seat, http://www.materialise.com/cases/materialiseslicingtechnologyenablestoyotaslightweightcarseat.

*Primary Examiner* — Philip F Gabler
(74) *Attorney, Agent, or Firm* — David R. Stevens; Stevens Law Group

(57) ABSTRACT

A seat includes one or more cushions secured to a shell. The cushions include a 3D printed lattice of repeating cells. The cells may include nodes interconnected by branches. The nodes may be arranged in a cubic, parallelepiped, diamond, or other arrangement. The branches may extend directly between nodes or may be bent. The branches may extend from each node to an adjacent node that is closest to its point of attachment to the each node or the branches may be curved or bent to secure to a different adjacent node. The 3D printed lattice may include 3D printed barbs formed thereon that engage receptacles in the seat shell. The 3D printed lattice may be printed with a groove that engages a fastening structure on a cover or a separate fastening element. The cover may be a perforated sheet of material or fabric.

11 Claims, 6 Drawing Sheets

(56) References Cited

U.S. PATENT DOCUMENTS

| | | | |
|---|---|---|---|
| 6,935,699 B2 | 8/2005 | Biermann | |
| 2015/0329027 A1* | 11/2015 | Axakov | B60N 2/565 297/180.13 |
| 2016/0251093 A1* | 9/2016 | Hijmans | B64G 9/00 244/173.1 |
| 2017/0036578 A1* | 2/2017 | White | B60N 2/5621 |

FOREIGN PATENT DOCUMENTS

| | | |
|---|---|---|
| DE | 102013218223 A1 | 2/2015 |
| WO | WO-2015171856 A1 | 11/2015 |

\* cited by examiner

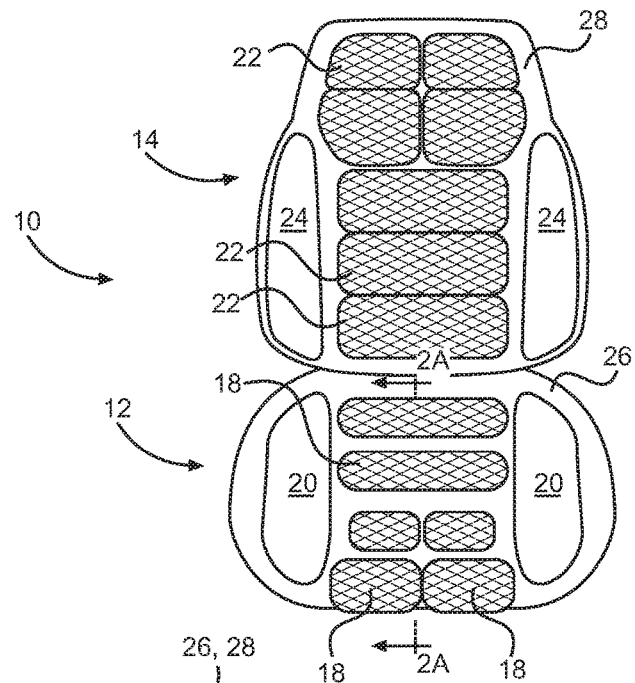
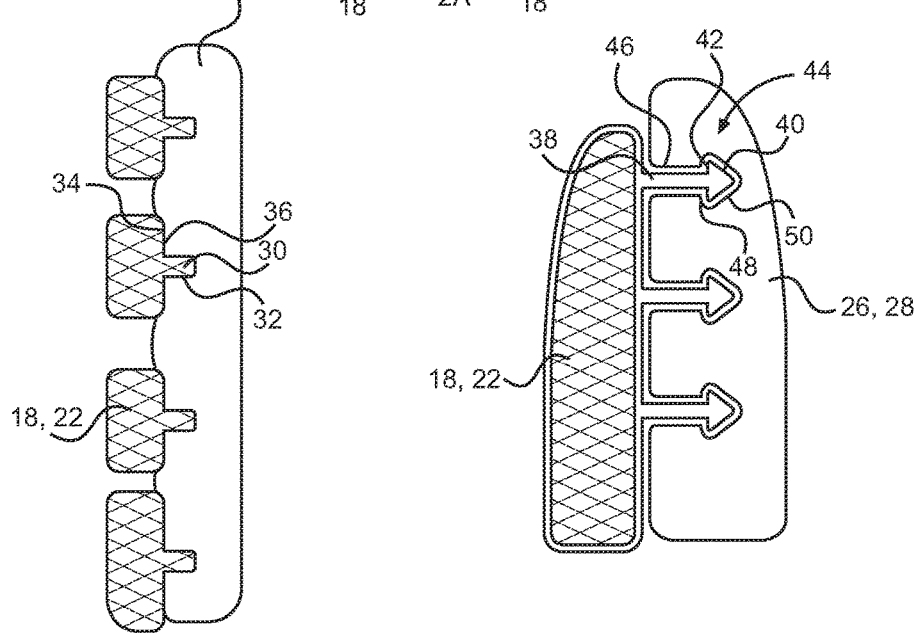
FIG. 1B
FIG. 2A FIG. 2B

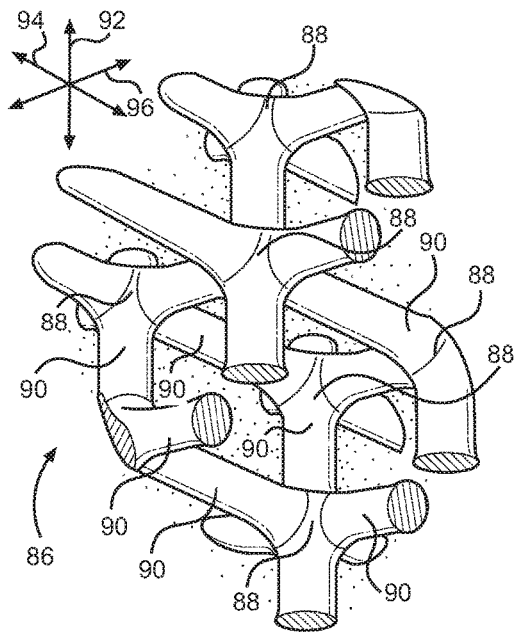 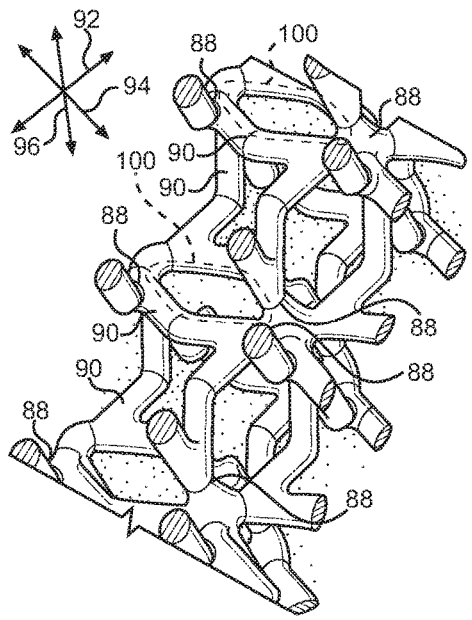
FIG. 6C  FIG. 6D
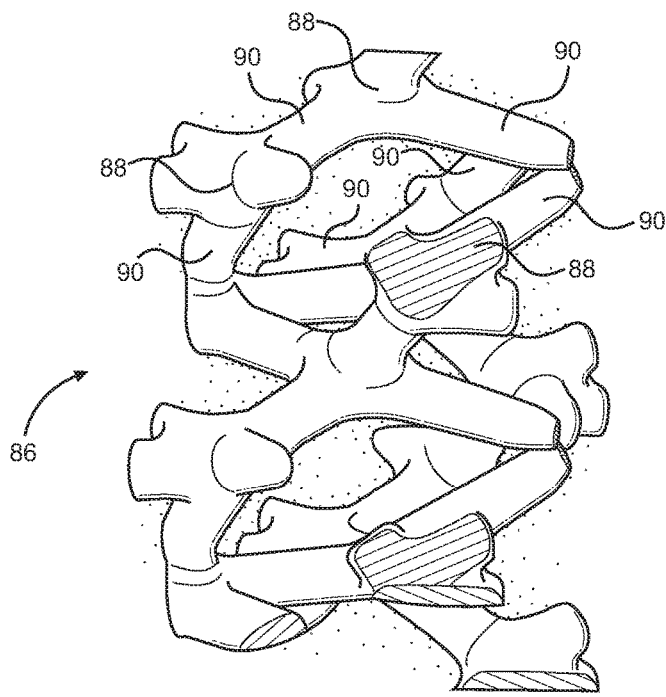
FIG. 6E

VENTILATED SEAT CUSHION

BACKGROUND

Field of the Invention

This invention relates to cushions for a seat of a vehicle or other applications.

Background of the Invention

Automotive seats are typically made of molded foam pads wrapped with either vinyl or leather outer cover. This current construction prohibits ventilation of moisture and air at the human skin layer interfacing with it. Even fabric-covered foam is insulative and prevents free air circulation. Such inefficiency of thermal and mass (e.g., sweat) transfer causes discomfort.

The systems and methods described herein provide an improved approach to the design and manufacture of cushions for use in vehicle seat bottoms, backs, headrests, or for any other application where cushions may be used.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 1B is a diagram of a seat shell having seat pads secured thereto in accordance with an embodiment of the present invention;

FIGS. 2A to 2B are side cross-sectional views showing securement of a cushion to a seat shell in accordance with an embodiment of the present invention;

FIGS. 6A to 6F are perspective views of cells for use in a lattice structure of a seat pad in accordance with an embodiment of the present invention.

DETAILED DESCRIPTION

Figure 1A:
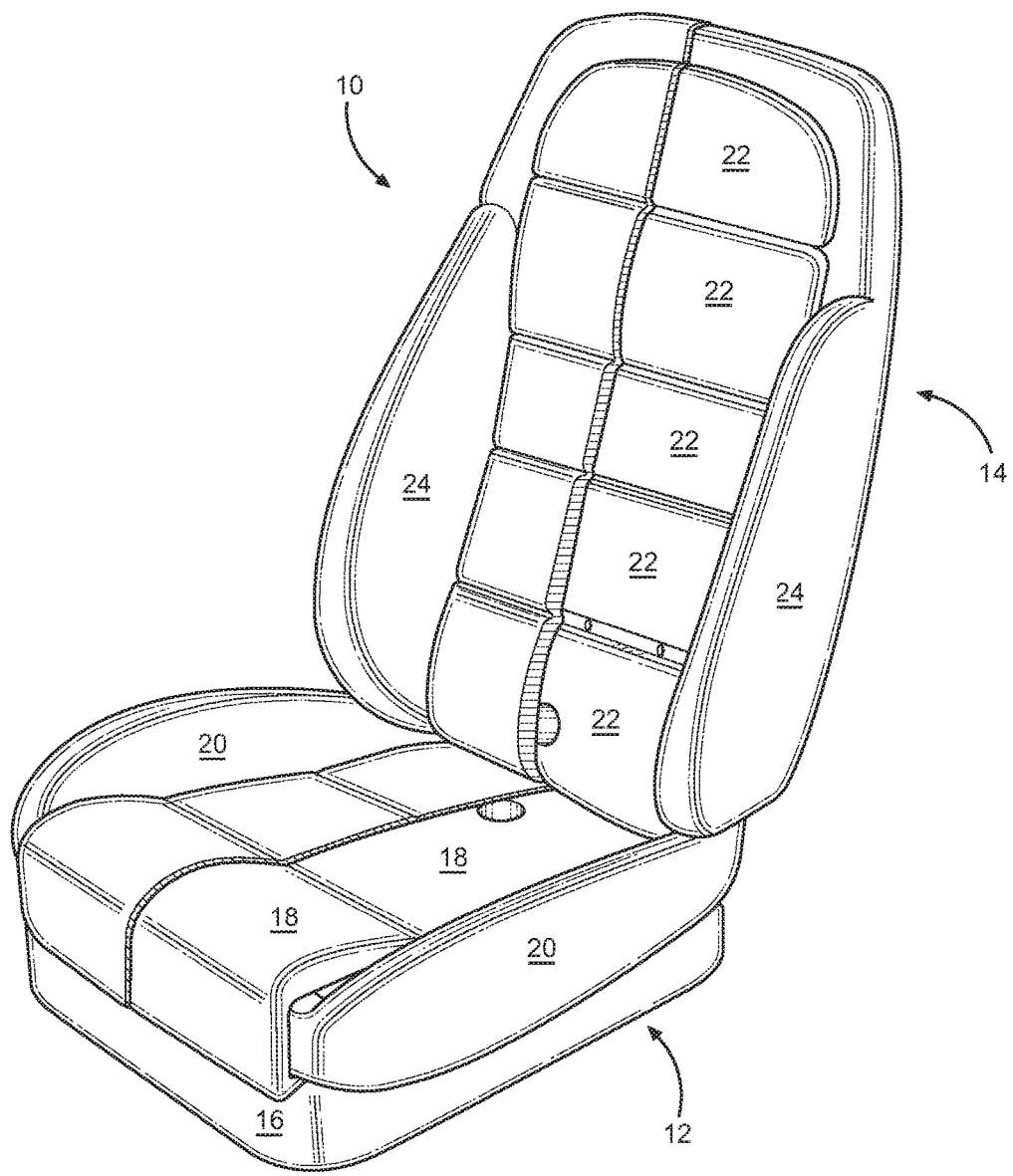
FIG. 1A is perspective view of a vehicle seat.

Referring to FIGS. 1A and 1B, a typical vehicle seat 10 includes a seat bottom 12 and seat back 14 oriented at an angle relative to the seat bottom 12 as known in the art. As also known in the art, the seat bottom 12 may be mounted to a base 16 that may include one or more motors for actuating the seat. One or more temperature modulating elements, e.g. heating and cooling elements may be embedded in the seat bottom 12 and/or seat back 14 as known in the art.

A seat 10 in accordance with the embodiments disclosed herein may include a seat bottom 12 having a plurality of cushions 18 defining a seating surface and lateral bolsters 20 extending upwardly and outwardly from the seating surface at an angle. Likewise, the seat back may include a plurality of cushions 22 defining a back support surface. Lateral bolsters 24 may extend forwardly and outwardly from the back support surface. In some embodiments, the cushions 18, 22 are formed of a 3D (three-dimensionally) printed lattice according to any of the embodiments described below. The bolsters 20, 24 may be formed of a conventional open cell latex foam, or any other cushioning material known in the art. In other embodiments, the bolsters 20, 24 are also formed of a 3D printed lattice according to any of the embodiments described below.

As shown, the cushions 18 and bolsters 20 may mount to a base shell 26. The cushions 22 and bolsters 24 may mount to a back shell 28. The shells 26, 28 may be formed of a rigid plastic, metal, composite (e.g. fiberglass or carbon fiber), or any other material of sufficient structural rigidity.

Referring to FIGS. 2A and 2B, the cushions 18, 22 may secure to the base shell 26 and back shell 28 by various means. For example, adhesives, ultrasonic welding, fasteners (screws, snap-in fasteners) or the like may be used to secure the cushions 18, 22 to the base shell 26 and back shell 28.

Referring to FIG. 2A, in some embodiments, the cushions 18, 22 may define a projection 30 that seats within a receptacle 32 formed in the base shell 26 and back shell 28. The receptacle 32 may facilitate alignment and placement of the cushions 28, 22. A surface 34 on the cushions 18, 22 may engage a corresponding surface 36 on the shell 26, 28. For example, surface 34 may bear one part of a hook-and-loop fastening system, e.g. VELCRO, and the surface 36 may bear the other part of the hook-and-loop fastening system. Alternatively, the surfaces 34, 36 may secure to one another by means of adhesive, ultrasonic welding, or a fastener.

Referring to FIG. 2B, in an alternative embodiment, the cushions 18, 22 are 3D printed having posts 38 protruding from a surface thereof. The posts 38 may include a tapered end 40 and shoulders 42 extending inwardly from the perimeter of the tapered end 40 to the posts 38. The shells 26, 28 may define receptacles 44. The receptacles 44 may be simple through-holes or may have corresponding features to the tapered end 40, shoulders 42, and post 38. For example, each receptacle 44 may include a cylindrical portion 46, a shoulder 48 radiating outwardly from the cylindrical portion 46, and a conical volume 50. Accordingly, as shown in FIG. 2B, when engaged the posts 38 are positioned in the cylindrical portion 46, the shoulder 40 engages the shoulder 48, and the tapered end 40 is positioned within the conical volume 50.

In some embodiments, the posts 38 and tapered end 40 may be rectangular, i.e. a projection of the illustrating cross section. Accordingly, the receptacles 44 may have a corresponding constant cross section perpendicular to the page.

Figure 3:
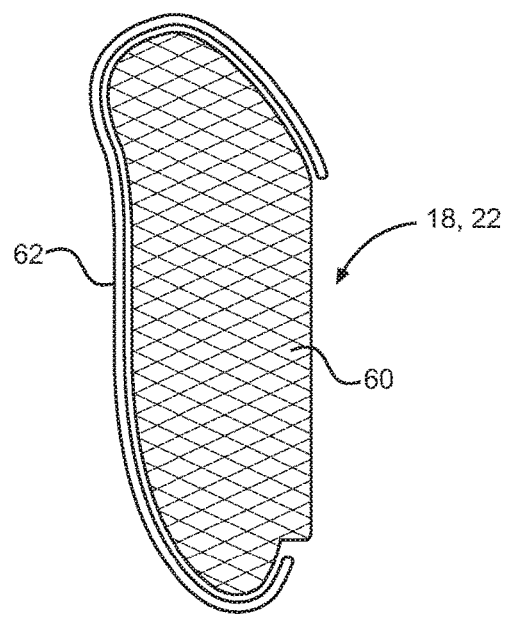
FIG. 3 is a side cross-sectional view of a cushion including a lattice structure having a cover secured thereto in accordance with an embodiment of the present invention.

Referring to FIG. 3, a cushion 18, 22 may include a 3D printed lattice 60 having a cover 62 extending over surfaces of the lattice 60 that support a seated person when the cushion 18, 22 is mounted to its corresponding shell 26, 28. The cover 62 is preferably formed of a breathable material such as perforated leather, imitation leather, or other plastic material. The cover 62 may be formed of a breathable fabric. Various means may be used to secure the cover 62 to the 3D printed lattice 60. For example, an adhesive may be positioned between the mating surfaces of the cover 62 and 3D printed lattice 60. Alternatively, the cover may be sewn to the 3D printed lattice 60 or secured thereto by means of fasteners such as rivets.

Figures 4A, 4B:
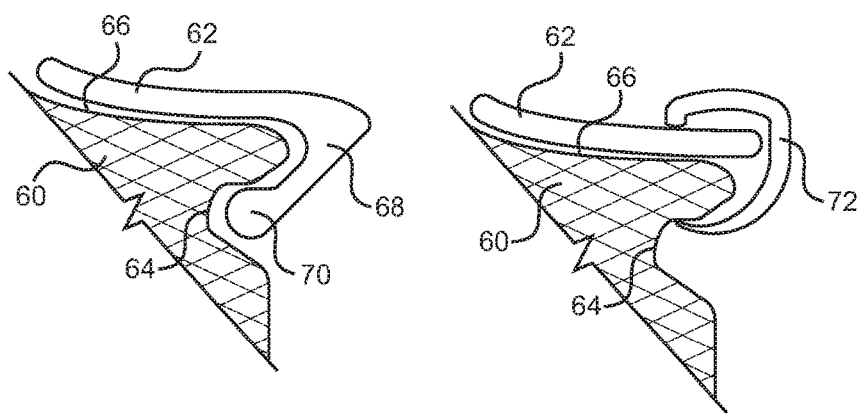
FIGS. 4A and 4B are side cross sectional views showing means for securing a cover to a cushion in accordance with an embodiment of the present invention.

Referring to FIG. 4A, in some embodiments, the cover 62 secures to the 3D printed lattice 60 along its edge. For example, the 3D printed lattice 60 may be manufactured with a groove 64 undercutting a surface 66 thereof. The groove 64 may extend completely around the cushion 18, 22. The cover 62 may define a hook 68 with an end portion 70 that seats within the groove 64. In some embodiments, the hook 68 and/or end portion 70 are formed of a rigid material, such as rigid yet flexible polymer that is different from the breathable material forming the rest of the cover 62. In some embodiments, an elastic is sewn or otherwise secured around an edge of the cover 62 such that the elastic seats within the groove 64 in order to retain the cover 62 in engagement with the 3D printed lattice 60.

Referring to FIG. 4B, in an alternative embodiment, a clip 72 seats within the groove 64 and grasps the cover 62 between itself and the surface 66 thereby retaining the cover 62. The clip 72 may include an elongate member having the illustrated cross-section such that the clip 72 secures the cover 62 along some or all of the perimeter of the cushion 18, 22.

Figure 5:
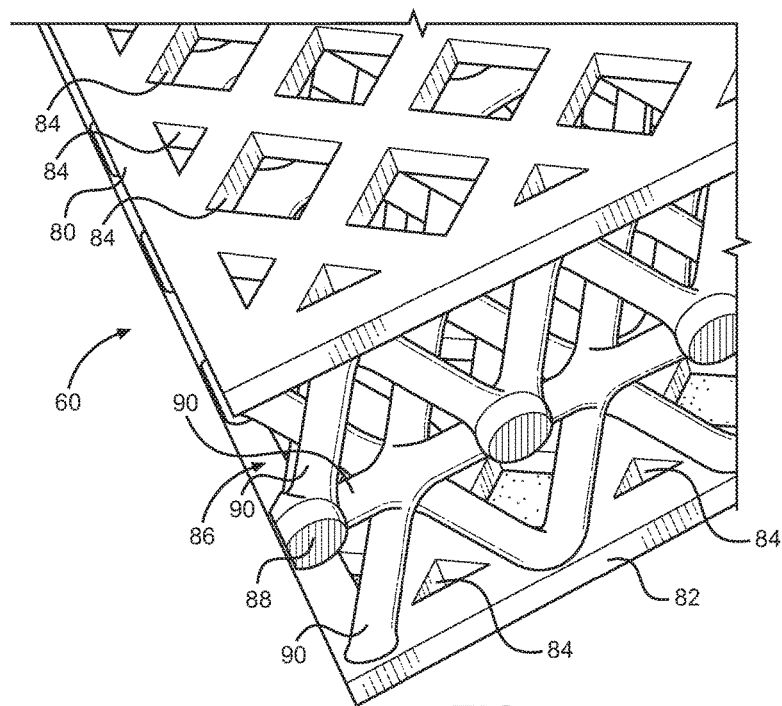
FIG. 5 is a perspective view of a 3D printed cushion in accordance with an embodiment of the present invention.

Referring to FIG. 5, in some embodiments, the 3D printed lattice 60 may have the illustrated configuration. 3D printing the cushions 18, 22 may include any additive manufacturing process known in the art. For example, the cushions 18, 22 may be 3D printed out of a photo-polymer, thermo-polymer, or any other polymer using any additive manufacturing technique known in the art.

As shown, the 3D printed lattice 60 may include an upper sheet 80 and a lower sheet 82. The sheets 80, 82 may be planar sheets of material having apertures 84 extending therethrough to facilitate ventilation. An array of cells 86 are positioned between the sheets 80, 82 according to regular repeating pattern. The apertures 84 may have a repeating pattern having identical pitch to that of the repeating pattern of the cells 86. Each cell includes at least one node 88 and a plurality of branches 90 extending from the node 88 to an adjacent node 88. The cells 86 may have multiple configurations and may be selected to provide desired properties for the 3D printed lattice 60, e.g. firmness, ventilation, etc.

Figure 6A:
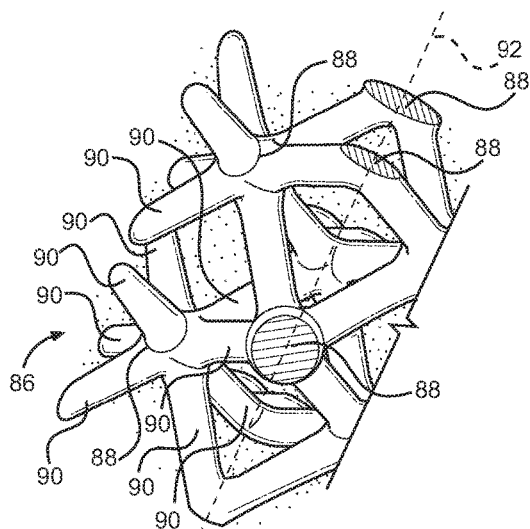

FIGS. 6A to 6F illustrate example cells 86 that may be used in the 3D printed lattice 60. Referring to FIG. 6A, in one embodiment the cells 86 include nodes 88 arranged at the vertices of a diamond and the branches 90 positioned along the edges of the diamond. In the illustrated embodiment, a pair of nodes 88 positioned on opposite corners of the diamond are aligned along a vertical direction 92, which corresponds generally (e.g. within 15 degrees) of a direction of compression of the 3D printed lattice 60 when in use. As shown in the embodiment of FIG. 6A, each node 88 has eight branches 90 protruding therefrom.

Figure 6B:
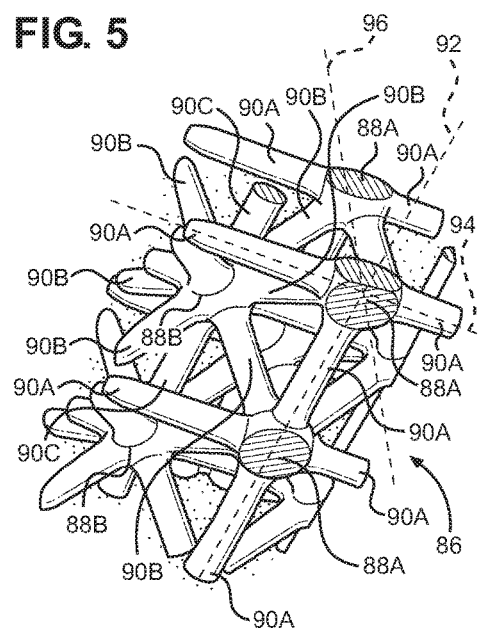

Referring to FIG. 6B, in another embodiment, the nodes 88 include first nodes 88A arranged in a cubic arrangement aligned with the vertical direction 92, horizontal direction 94, and longitudinal direction 96, the directions 92, 94, 96 all being mutually orthogonal. The directions 92, 94, 96 are called out to facilitate definition of the cells 86 described herein and do not necessarily correspond to the actual vertical, horizontal, and longitudinal directions of a system in which the cells 86 are used.

As is apparent in FIG. 6B, the branches 90 include branches 90A that extend between nodes 88A that are aligned along vertical direction 92 and along the horizontal direction 94. Note that in the illustrated embodiment, the branches 90A do not extend between nodes 88A that are aligned along the longitudinal direction 96.

The nodes 88 further include nodes 88B that are positioned at the center of cubes defined by the nodes 88A. The branches 90 further include branches 90B that extend from each node 88B to adjacent nodes 88A, i.e. that radiate diagonally outwardly from the center of the cube defined by the nodes 88A to the corners of the cube.

In the illustrated embodiment, the branches 90 further include branches 90C that extend between nodes 88B that are aligned along the vertical direction 92. Accordingly, in the illustrated embodiment each node 88A has 12 branches 90A, 90B connected thereto and each node 88B has 10 branches 90B, 90C connected thereto.

Referring to FIG. 6C, in another embodiment, the nodes 88 are arranged on a parallelepiped that may be cubic nor non-cubic. The edges of the parallelepiped may be at a non-zero and non-perpendicular angle with respect to some or all of the vertical, horizontal, and longitudinal directions 92, 94, 96.

Referring 6D, in another embodiment, the nodes 88 are arranged in a cubic arrangement with edges aligned with the vertical, horizontal, and longitudinal directions 92, 94, 96. In this embodiment, the branches 90 extending between nodes are bent such that rings 100 are defined by the branches 90. The rings 100 may be oriented at a non-zero and non-perpendicular angle with respect to the vertical, horizontal, and longitudinal directions 92, 94, 96. As is also apparent, the rings 100 may be arranged at non-zero angles with respect to one another according to a repeated pattern.

Referring to FIG. 6E, in another embodiment, the nodes 88 are arranged in a non-cubic and non-parallelepiped arrangement. The nodes 88 include only four branches 90 protruding therefrom.

Figure 6F:
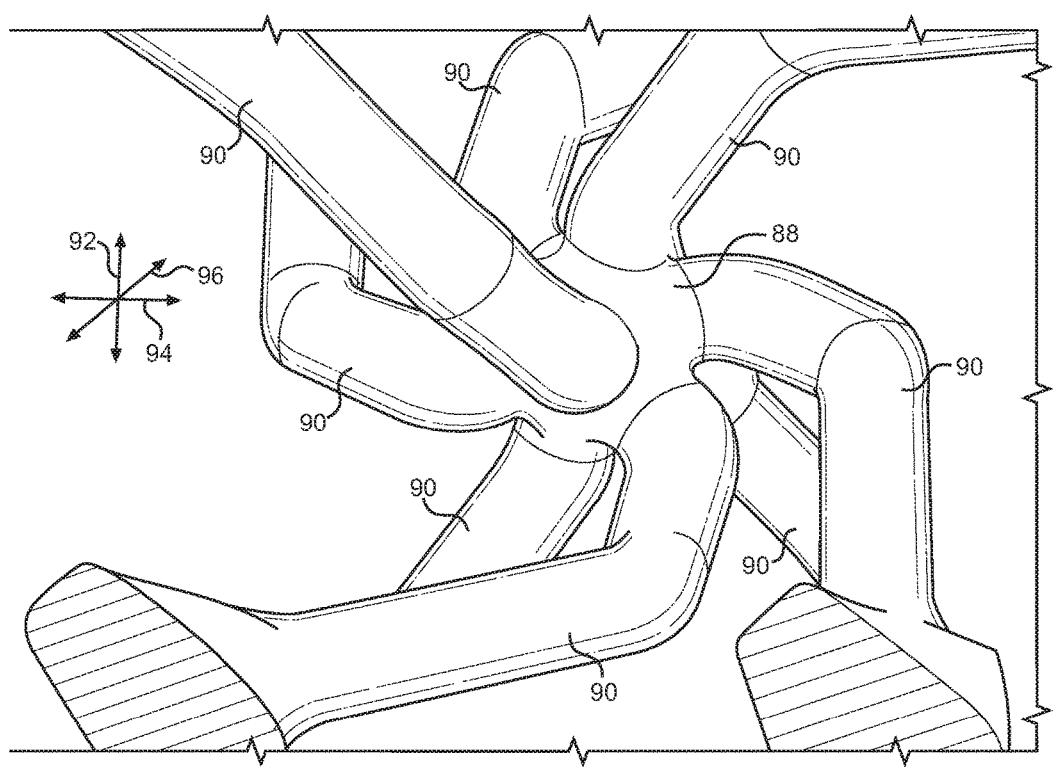

Referring to FIG. 6F, in another embodiment, the nodes 88 of a cell 86 are arranged on the vertices of a diamond, such as a diamond having the orientation shown in FIG. 6A. However, each node 88 is "twisted" relative to some or all of the directions 92, 94, 96. In particular, each branch 90 does not follow a direct path to an adjacent node 88 from the point of attachment to the each node 88, but rather is bent and curve around each node 88 to connect to an adjacent node 88. The amount of twist and the shape of the branches 90 may vary in order to alter the properties of the 3D printed lattice 60 including the cells 86. In particular, note that the embodiment of 6F converts linear compression into torsional deformation of the branches 90, rather than linear stretching or compression of the branches 90.

Various modifications of the cells 86 may be performed to adjust the properties of the 3D printed lattice 60 to achieve desired mechanical properties. In addition, the size of the cells 86 may be modified to affect the desired mechanical properties. The cells 86 shown above may have a size along any of the directions 92, 94, 96 of between 5 and 30 mm. The branches 90 may have a diameter of 1 and 5 mm.

In some embodiments, the size of the cells 86 may also be varied within the same cushion 18, 22 or from one cushion 18, 22 to an adjacent cushion in order to provide varying firmnesses. The lattice pattern used within the same cushion 18, 22 or a set of cushions 18, 22 used for a seat may also vary in order to provide varying and/or tailored firmnesses. For example, arbitrary nodes or solid or perforated planes may be introduced at the boundaries between cells 86 having a different size or different pattern, the branches 90 of the cells 86 may then attach to the arbitrary nodes or to opposing sides of the plane.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

What is claimed is:

1. A method for manufacturing a cushion comprising:
providing a seat shell;
three dimensionally (3D) printing one or more polymer pads having a porous structure providing ventilation; and
fastening the one or more polymer pads to the seat shell;
wherein 3D printing the one or more polymer pads comprises 3D printing a lattice structure having repeated cells; wherein each cell of the repeated cells includes a node and a plurality of branches each connecting the node to other nodes of the lattice structure.

2. The method of claim 1, wherein the nodes of the repeated cells are arranged in a cubic relationship.

3. The method of claim 1, wherein the nodes of the repeated cells are arranged in a parallelepiped relationship.

4. The method of claim 1, wherein the plurality of branches are each bent between points of attachments to the nodes of the repeated cells.

5. The method of claim 1, wherein the plurality of branches connecting the node of each cell of the repeated cells to other nodes of the lattice structure do not connect to nodes of the lattice structure that are closest to the node.

6. The method of claim 1, wherein each cell of the repeated cells includes between 6 and 12 branches connected thereto.

7. The method of claim 1, wherein 3D printing the one or more polymer pads comprises printing a perforated sheet of material at least one of above and below the lattice structure.

8. The method of claim 1, wherein 3D printing the one or more polymer pads comprises printing one or more barb structures on the one or more polymer pads; and
wherein fastening the one or more polymer pads to the seat shell comprises engaging the one or more barb structures with one or more apertures defined by the seat shell.

9. The method of claim 1, further comprising fastening a layer of porous material over the one or more polymer pads.

10. The method of claim 9, wherein 3D printing the one or more polymer pads comprises 3D printing the one or more pads such that an indentation is formed around a lower edge of the one or more pads;
wherein fastening the layer of porous material over the one or more polymer pads comprises engaging a fastener with the layer of porous material and the indentation; and
wherein the fastener comprises at least one of a clip and an elastic member secured around a perimeter of an opening defined by the layer of porous material.

11. The method of claim 1, further comprising mounting the seat shell within a vehicle.

* * * * *